United States Patent [19]

Bigolin

[11] Patent Number: 5,544,936
[45] Date of Patent: Aug. 13, 1996

[54] BICYCLE RESILIENT SADDLE

[76] Inventor: Giuseppe Bigolin, Via Aldo Moro 7, 36026-Rossano Veneto (Vicenza), Italy

[21] Appl. No.: 295,928

[22] Filed: Aug. 25, 1994

[30] Foreign Application Priority Data

Sep. 17, 1993 [IT] Italy ................... MI930725 U

[51] Int. Cl.⁶ ........................................ B60N 2/38
[52] U.S. Cl. ................ 297/195.1; 297/204; 297/206
[58] Field of Search ................... 297/195.1, 203, 297/204, 206, 313, 338

[56] References Cited

U.S. PATENT DOCUMENTS

| | | | |
|---|---|---|---|
| 511,363 | 12/1893 | Sager | 297/204 |
| 5,362,126 | 11/1994 | Bontrager | 297/195.1 |

FOREIGN PATENT DOCUMENTS

| | | | |
|---|---|---|---|
| 389542 | 9/1921 | Germany | 297/203 |
| 8429005 | 5/1952 | Germany | 297/204 |
| 6206 | of 0000 | United Kingdom | 297/206 |
| 473405 | 10/1937 | United Kingdom | 297/195.1 |

*Primary Examiner*—Laurie K. Cranmer
*Attorney, Agent, or Firm*—Bucknam and Archer

[57] ABSTRACT

An improved resilient bicycle saddle comprises a front suspension assembly, comprising a swinging lever including a pin anchored to a hook element projecting from the bottom surface of the saddle body and ending with a front end portion pressing on a rubber pad housed in a front holding element.

5 Claims, 2 Drawing Sheets

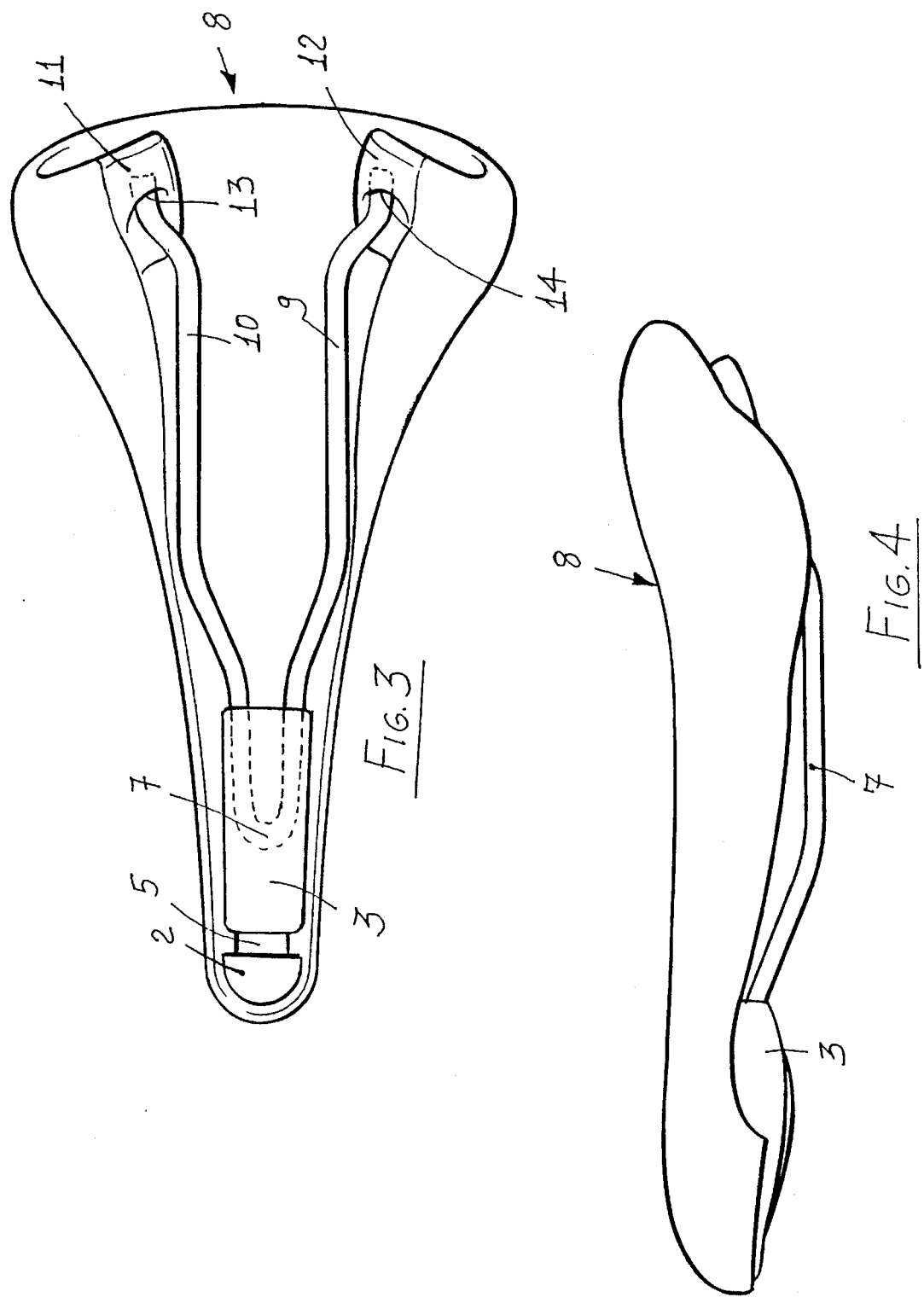

BICYCLE RESILIENT SADDLE

The present invention relates to an improved resilient bicycle saddle which has a particularly simple and strong construction.

More specifically, the main object of the present invention has been that of providing a resilient bicycle saddle having very good comfort properties, as well as improved stress absorbing properties such to allow the saddle to easily absorb any stresses transmitted to the framework of the saddle.

Another object of the present invention has been that of providing a bicycle saddle construction which can be constructed in a very unexpensive manner.

Yet another object of the present invention has been that of providing such a resilient bicycle saddle the component elements of which can be easily assembled without the need of using dedicated tools.

SUMMARY OF THE INVENTION

According to one aspect of the present invention, the above mentioned objects, as well as yet other objects, which will become more apparent hereinafter, are achieved by an improved bicycle resilient saddle including a front suspension assembly, comprising a swinging lever having a pin element anchored to a hook element projecting from a lower surface of the saddle body and ending with a front end portion pressing on a rubber pad engaged in a front holding element and being provided with a rear suspension assembly including two projecting resilient legs rigid with said saddle body.

BRIEF DESCRIPTION OF THE DRAWINGS

Further characteristics and advantages of the present invention will become more apparent hereinafter from the following disclosure of a preferred, though not exclusive, embodiment thereof, with reference to the figures of the accompanying drawings, where:

FIG. 3 bottom front view of the improved saddle according to the invention; and

FIG. 4 is a side view of the subject improved saddle.

DESCRIPTION OF THE PREFERRED EMBODIMENT

Figure 2:
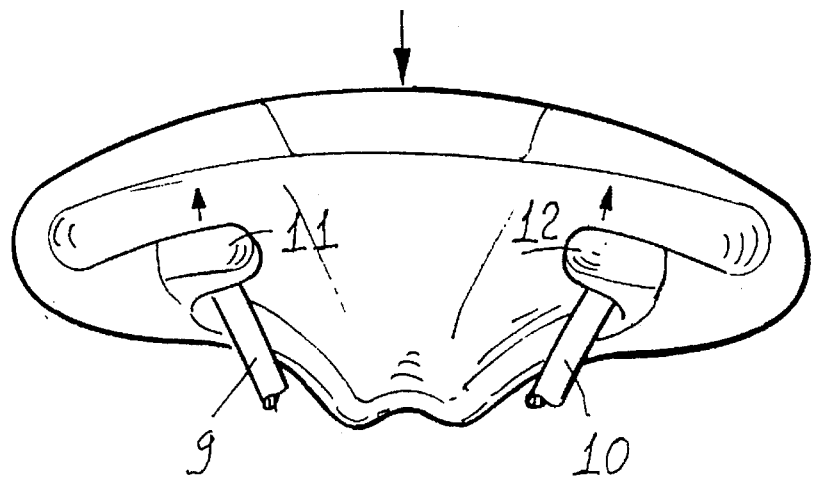
FIG. 2 is a rear side view of the improved saddle and specifically illustrating the features of the projecting legs of the saddle forming the rear suspension assembly of said saddle.
Figure 1:
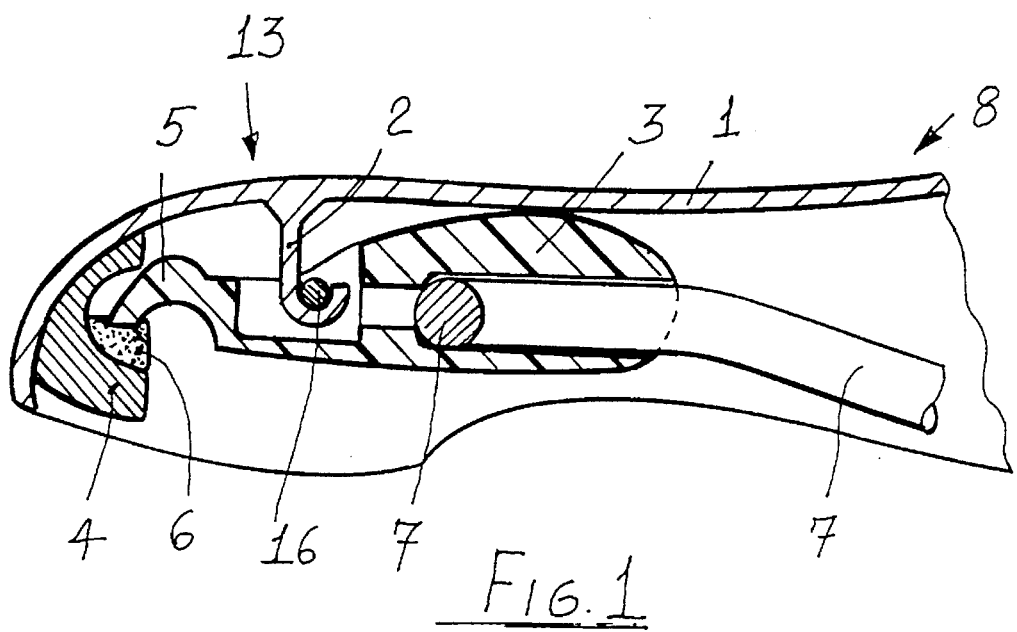
FIG. 1 a cross-sectioned side view illustrating the front portion of the improved bicycle resilient saddle according to the present invention.

With reference to the number references of the figures of the accompanying drawings, the improved bicycle resilient saddle according to the present invention, which has been generally indicated at the, reference number 8, comprises a front suspension assembly 13, including a swinging lever, preferably made of nylon or any other flexible plastic material, or any other materials having suitable resiliency features.

The swinging lever 3 has a convex rear portion so as to essentially contact the bottom surface of the saddle body 1 and is provided with a pin 16 which is arranged at a set intermediate position of the lever adapted to be anchored to a hook element rigid with and projecting from said bottom surface of the saddle body 1 which has a substantially smooth top surface.

Said swinging lever 3, in particular, ends with a front end portion 5, provided for engaging with and pressing on a rubber pad or any other suitable resilient damping element 6.

The latter, in particular, is suitably applied to and made rigid with the bottom front portion of the saddle body 1, which also constitutes an integrating portion of the subject saddle 8.

In this connection it should be pointed out that the front suspension assembly 13 is provided with a swinging lever 3, made of nylon or any other suitable plastic material, therein is engaged the front end portion of the metal rod like framework 7 supporting the saddle 8.

Thus, the swinging lever 3, by partially turning about the pin 16, will allow the metal framework to perform mechanical oscillations which are damped and cushioned by the rubber pad 6 thereon ,operates, as stated, the front end portion of the swinging lever 3.

Rod elements 9 and 10 are moreover provided for engaging at the rear of the saddle in the projecting legs 11 and 12 constituting an integrating cantilever portion of the saddle body 1, which is made of a plastic material.

The above mentioned projecting legs 11 and 12, in particular, are so designed as to operate as rear resilient elements The projecting legs 11 and 12, furthermore, are provided with orifices 13 and 14 therein are engaged end portions of said rod elements 9 and 10 which, being suitably bent at one end thereof, will form the metal framework 7.

The projecting legs 11 and 12 can also comprise a core portion made of any suitable metal material or other reinforcement resilient material.

From the above disclosure it should be apparent the great constructional Simplicity of the several elements forming the saddle according to the invention.

In particular, it should be apparent that a resilient saddle has been provided in which the saddle front and rear suspension assemblies are properly protected either jointly or separately from one another.

While the invention has been disclosed and illustrated with reference to a preferred embodiment thereof, it should be apparent that the disclosed embodiment is susceptible to several modifications and variations all of which will come within the spirit and scope of the appended claims.

I claim:

1. An improved resilient bicycle resilient saddle comprising a metal rod framework and a saddle body supported by said metal framework, wherein said saddle body has a substantially smooth top surface and a bottom surface, said saddle including therein a front suspension assembly, comprising a swinging flexible plastic lever having a convex rear portion contacting said bottom surface of said saddle body, said lever being provided with an intermediate pin having an axis of rotation, a hook element projecting from said bottom surface of said saddle body and engaging said hook element and a rubber pad disposed within in a front holding element, wherein said holding element is attached to a front portion of said bottom surface of said saddle body, and wherein a front end portion of said metal framework is engaged within said rear portion of said lever.

2. An improved resilient bicycle saddle, according to claim 1, wherein said swinging lever, oscillates about said axis of rotation wherein resulting oscillations are dampened by said rubber pad.

3. An improved resilient bicycle saddle, according to claim 1, wherein said saddle is provided with a rear-suspension assembly, including projecting legs which constitutes an, integral cantilever portion of said saddle body, which is made in part of a plastic material.

4. An improved resilient bicycle saddle, according to claim 3, wherein said projecting legs are resilient rear elements provided with orifices for receiving rear end rod portions of said metal framework.

5. An improved resilient bicylce saddle, according to claim 3, wherein said projecting legs comprise a core element made of a metal material.

* * * * *